United States Patent [19]

Shoemaker et al.

[11] 4,046,952

[45] Sept. 6, 1977

[54] MANUFACTURE OF OVERLAYED PRODUCT WITH PHENOL-FORMALDEHYDE BARRIER FOR POLYISOCYANATE BINDER

[75] Inventors: Philip D. Shoemaker, Baker; Hobert O. McQueary, Sweet Home, both of Oreg.

[73] Assignee: Ellingson Timber Co., Baker, Oreg.

[21] Appl. No.: 620,850

[22] Filed: Oct. 8, 1975

Related U.S. Application Data

[63] Continuation-in-part of Ser. No. 404,026, Oct. 5, 1973, Pat. No. 3,919,017, and Ser. No. 441,278, Feb. 11, 1974, Pat. No. 3,930,110.

[51] Int. Cl.² ............................................. B32B 33/00
[52] U.S. Cl. ............................................. 428/423; 156/90; 156/331; 156/335; 260/67 TN; 260/838; 264/109; 428/326; 428/526; 428/530
[58] Field of Search ............... 428/423, 526, 527, 528, 428/530, 326; 264/109; 144/309 R, 309 P, 309 Q, 309 W; 260/67 TN, 841, 838; 156/90, 331, 335, 285

[56] References Cited

U.S. PATENT DOCUMENTS

| | | | |
|---|---|---|---|
| 2,430,479 | 11/1947 | Pratt et al. | 156/331 |
| 3,440,189 | 4/1969 | Sharp | 264/109 |
| 3,666,593 | 5/1972 | Lee | 156/285 |
| 3,821,056 | 6/1974 | Reardon | 156/331 |
| 3,870,665 | 3/1975 | Diehr | 428/423 |

*Primary Examiner*—Edward G. Whitby
*Attorney, Agent, or Firm*—Kolisch, Hartwell, Dickinson & Stuart

[57] ABSTRACT

Production of consolidated overlayed product comprising a core of particulate cellulosic material bound with a polyisocyanate binder and an overlay bound to the core through a phenolformaldehyde resin which forms a barrier inhibiting penetration of the polyisocyanate into the overlay.

11 Claims, No Drawings

MANUFACTURE OF OVERLAYED PRODUCT WITH PHENOL-FORMALDEHYDE BARRIER FOR POLYISOCYANATE BINDER

This application is a continuation-in-part of copending applications Ser. No. 404,026 filed on 10/5/73 now U.S. Pat. No. 3,919,017 and Ser. No. 441,278 filed on 2/11/74 now U.S. Pat. No. 3,930,110.

This invention relates generally to the production of consolidated overlayed products which include a core of comminuted or particulate cellulosic material and an overlay bonded to such core.

Many structural products are manufactured by the basic process of consolidating or joining together bodies of cellulosic material using pressure, heat and a chemical binder. Included among these are wood based products such as plywood, hardboard, particleboard, veneer-faced particleboard, and pressed or molded products made from vegetable fibers such as cornstalks, straw, bagasse, or some other cellulosic materials such as pulp, shredded paper and the like. Typically, the adhesives or binders used in making such products are thermosetting resins such as Phenol-formaldehyde, resorcinol-formaldehyde, melamineformaldehyde, urea-formaldehyde, urea-furfural, and condensed furfuryl alcohol resins.

In recent years, attention has been directed to the use of an organic polyisocyanate as a binder in making consolidated products. The polyisocyanate which in most instances is in liquid form, or in some instances the form of a dry, powdered material, is blended with the cellulosic material to form a furnish, and with the application of heat and pressure a bond is produced wherein the comminuted material becomes a solid body. A product produced in this manner exhibits good strength and weathering properties, but unfortunately, the affinity of isocyanates with metal may introduce severe sticking problems during the pressing operation which typifies panel manufacture.

Considering, for example, the manufacture of a veneer overlayed particleboard product, when a polyisocyanate is employed as the binder, such tends to penetrate into and through the veneer during the press cycle, with the production of a bond with the caul plates used in the press, with the result that after the press cycle the product tends to stick to the caul plate unless special release agents are employed.

The instant invention concerns an approach to the manufacture of a consolidated product, which has been found to essentially eliminate the sticking normally characterizing the use of a polyisocyanate binder, and which furthermore affords the opportunity to produce a very superior type of board with exceptionally good strength, weathering and aging properties.

A feature of the invention therefore, is the provision of a novel process for manufacturing an overlayed product from comminuted cellulosic material, which relies on the use of a phenol-formaldehyde resin in the securing of an overlay to a core of cellulosic material bound by an organic polyisocyanate binder. Following the method, a superior bond between the overlay and the core results, felt to arise in part from a chemical reaction occurring between the isocyanate in the furnish which is transformed into the core, with free hydroxyl groups in the phenolic resin. Additionally, the phenol-formaldehyde resin during the press cycle undergoes condensation, which is effective to form a barrier inhibiting the penetration of polyisocyanate in the furnish into an overlay and against the caul plate which is used in the press. With polyisocyanate employed as a binder for the cellulosic material in the core, there is minimal production of steam within the core, which takes care of blow problems, etc. normally experienced when overlayed products are produced. Springback in the core, or the tendency for the core to enlarge after the press cycle, is insignificant. Conditions may be set, so that post polymerization, or polymerization of the binder within the core after the press cycle, as occurs with furnishes including a phenolic resin binder with the production of an exothermic reaction, is insignificant.

The invention is particularly suited for the production of overlayed products where the overlay comprises a water permeable sheet, such as a paper sheet and the like. In this connection, rather surprisingly, it has been noted that when paper is employed in the overlay, exceptional results are obtained if the paper is wetted prior to introducing the assembly comprising furnish and paper overlay to the press. As a consequence of such wetting, apparently the polymerization of the phenolformaldehye resin which bonds the overlay to the core is retarded to a sufficient degree to enable the pressure of the press to produce optimum contact between the paper and the cellulosic material of the furnish. The heat of the press converts the water in the paper to steam which is ultimately driven out through the paper, and which has the effect of slightly plasticizing the cellulosic material of the furnish. A superior product is produced which is excellent for exterior use, and at the same time excellent control of sticking with the caul plates is achieved.

The invention has advantages when employed with other types of overlays such as veneer overlays and the like. The invention may be practiced with various types of phenolformaldehyde resin deposits as the bonding agent for the overlay, including spreads of resin, so-called glue line sheets (which comprise resin supported on a cellulosic carrier), etc.

Thus, a general object is to provide an improved process for producing overlayed products from comminuted cellulosic material wherein the binder for the core comprises a polyisocyanate.

Another object is to provide novel products by the process contemplated.

A more specific object is to provide a novel method of producing overlayed products featuring the use of a phenolformaldehyde resin for adhering the veneer or other overlay to the core material with such occurring during the step of consolidating the assembly by the application of heat and pressure.

A particular object is to provide a novel process of preparing an overlayed product, utilizing water permeable overlays such as paper sheets and the like, wherein such sheets are essentially saturated with water prior to introduction into the press and consolidation.

These and other objects and advantages are attained by the invention, which is described hereinbelow in conjunction with certain specific examples that are illustrative of the invention.

In practicing the instant invention, a binder system may be employed in preparing a furnish from cellulosic material comprising an organic polyisocyanate and formaldehyde. It has been found, for instance, that products having superior strength and moisture resistance can be produced with such a binder, and cellulosic starting materials with relatively high moisture contents, i.e., up to 22%, may be employed in preparing the furnish which eliminates in many instances the necessity for predrying the cellulosic material.

The polyisocyanate component of the binder system may suitably be any organic polyisocyanate containing at least two active isocyanate groups per molecule, or mixture of such compounds. Included among the polyisocyanates that may be employed are diphenylmethane diisocyanates, m- and p-phenylene diisocyanates, chlorophenylene diisocyanates, toluene di- and triisocyanates, triphenylmethane triisocyanates, and diphenyl ether-2,4,4'-triisocyanate. Polyphenylpolyisocyanates, such as diphenylmethane-4,4'-diisocyanate, and particularly suitable. Polyisocyanate mixtures may also be used, such as "PAPI", a commercially available approximately trifunctional polymethylene polyphenylisocyanate marketed by the Upjohn Company, Polymer Chemicals Division.

Formaldehyde is a gas at ordinary temperatures. Therefore, the formaldehyde employed in the binder system preferably is introduced as an aqueous formaldehyde solution of any convenient concentration, such as commercially available 37%, 44%, etc. solutions.

When using polyisocyanate and formaldehyde in preparing the furnish, the ratio of isocyanate to formaldehyde is not critical. The optimum ratio for a given application ordinarily may be determined by routine experimentation. A polyisocyanate: formaldehyde ratio ranging from 2:3 to 5:1 has been successfully employed. Ordinarily, ratios ranging between about 1:1 and 4:1 are used, to control fuming problems, to obtain economies, etc. The quantity of binder needed in a particular application likewise is ordinarily determined by simple experimentation. Amounts in the range of 2 to 5% by weight, based on the dry weight of cellulosic material, have been used with good results. In discussing herein weights, percentages and ratios, reference, of course, is made to constituents on a solids basis unless otherwise stated.

The cellulosic material which is employed in making the furnish which is transformed into the core of the overlayed product of the instant invention comprises particles of cellulosic material, typically wood particles derived from lumber manufacturing wastes such as planer shavings, veneer chips, and the like. If desired, mixtures of cellulosic particles may be used. Thus a furnish has been prepared from wood particle mixtures containing up to about 30% bark. Other materials comprise particulate prepared from cornstalks, straw, shredded paper and the like. In the manufacture of a particleboard-type product, and using a binder system comprising formaldehyde and polyisocyanate, the moisture content of the particles may range up to about 22% by weight. Typically, particles made from lumber waste materials contain about 10 to 20% moisture and these may be used without first being dried. To obtain maximum economies in dryer operation, ordinarily particles would be used having a moisture content ranging upwardly from about 6%. However, particles containing a lesser amount of moisture may be used but such needlessly adds to dryer costs.

A furnish may also be prepared using as a binder an organic polyisocyanate of the type hereinabove described and without the inclusion of formaldehyde.

In the production of a furnish from comminuted cellulosic material, the binder which is employed may be sprayed onto the particles as they are tumbled or agitated as in a blender. Where the binder includes polyisocyanate and formaldehyde, such may be separately added or added at the same time with the order of addition being unimportant. Furthermore, of course, where other materials are to be employed in the furnish such as wax, sizing material, fire retardant, etc., such ordinarily is mixed with the comminuted material together with the binder.

As contemplated by the instant invention, in the making of an overlayed product such as particleboard overlayed with veneer, paper, etc., the overlay is prepared to have a phenol-formaldehyde resin distributed therein and presented by the overlay toward the mat or felted layer of furnish which ultimately forms the core in the overlayed product. The phenolformaldehyde resin during the press cycle cures to form a weather resistant bond with the polyisocyanate bound cellulosic material in the core. It has further been noted that the resin produces a barrier inhibiting penetration of the organic polyisocyanate through the overlay. Thus, using the resin, overlays may be employed in the manufacture of a consolidated product which may be thin veneer sheets, or even paper, with no significant isocyanate caused sticking with the caul plates in the press. Furthermore, the ultimate bond produced between the overlay and the core in the consolidated product is excellent, felt to be at least partly attributable to the chemical reaction occurring between the isocyanate binder and the phenol-formaldehyde resin.

Ordinarily, the resin in the overlay which produces the bond with the core is distributed at a rate ranging between 11 to 86 gms/m² (on a solids basis).

In the binding together of cellulosic material employing an organic polyisocyanate binder it is felt that a chemical type bond is produced with the cellulosic bodies by reason of the isocyanate groups present in the polyisocyanate reacting with the free hydroxyl groups present in cellulosic materials to form urethane bridges. This reaction may be illustrated by the following equation, where $C_1$ and $C_2$ represent adjacent bodies of cellulosic materials, and R represents an organic group comprising the nonisocyanate body portion of a polyisocyanate molecule.

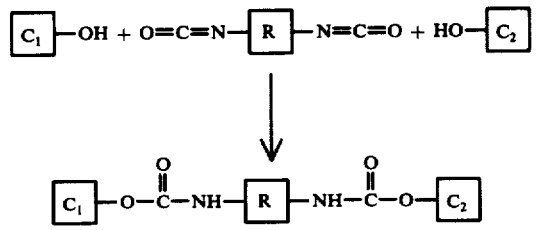

In addition, a portion of the polyisocyanate reacts with water present in the furnish in the form of moisture to produce a polyurea according to the equation set forth below, where $R_1$, $R_2$ represent organic groups comprising the nonisocyanate body portions of different polyisocyanate molecules. Where formaldehyde is present the polyurea produced in this manner may react with the formaldehyde to form a polyurea-formaldehyde resin which aids in bonding the cellulosic bodies together.

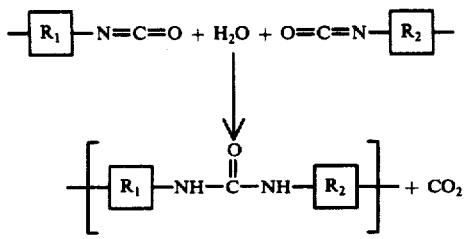

The phenol-formaldehyde resin in the overlay which serves to bond the overlay to the core in the consolidated product includes phenolic hydroxyl groups available for reaction with the isocyanate groups present in the polyisocyanate to form urethane linkages, generally in the manner illustrated in the first equation set forth above. The resin in the overlay, therefore, is felt to produce the usual adhesive type bond with the core, as well as a chemical type bond by reason of the above set forth reaction, while still performing the important function of providing a barrier inhibiting penetration of the polyisocyanate through the overlay and against any caul plate which produces the consolidated product.

The invention has particular utility in connection with the manufacture of an overlayed product wherein the overlay comprises a paper sheet bonded to the core. Paper is a relatively highly permeable material, and in the usual instance the manufacture of a product utilizing an isocyanate binder system for the assembly would present many difficulties were the overlay used a paper sheet. By the inclusion of phenol-formaldehyde in the overlay, very superior products are produced without experiencing the sticking that would normally be expected. The product is also advantageous since by reason of the isocyanate binder for the cellulosic material in the core, there is minimal production of steam within the core during the press cycle, which minimizes blow problems which may be acute when an overlay is present. A polyisocyanate bound core exhibits minimal springback, i.e., enlargement of the core after the press cycle has been completed. For instance, in a 1.59 cms thick core, a springback of less than 0.013 cm is usually noted.

In the production of a paper overlayed product, it has been found that exceptionally good results are obtained if the paper in the overlay prior to consolidation by the application of pressure and heat is saturated or permeated with water. This can be done as by spraying or roller coating the paper with water, over that side of the paper sheet which faces away from the mat during preparation of the assembly which is passed into the press. The amount of water that is introduced may commonly range from about 75 to 200% of the weight of the paper in the sheet on a dry basis. With such wetting of the overlay, during the press cycle, and by reason of the production of steam in the region of the wetted sheet, polymerization of the phenolformaldehyde resin apparently is retarded until full pressure and intimate contact of the particulate material in the core is achieved. The moisture or steam produced apparently also serves to plasticize to a certain degree the cellulosic material, which apparently enables the polyisocyanate in the furnish to more completely bond the cellulosic material. Whatever the phenomenon involved, a product is producible capable of withstanding the most severe of the usual tests applied to consolidated products to evaluate them for exterior use.

In utilizing the invention, press temperatures ranging between 135° C. are typical.

The following are examples specifically illustrating the invention.

EXAMPLE I

A paperfaced particleboard panel was produced as follows:

A small green Lodgepole pine tree section, including trunk, limbs, bark, and needles, was passed through a chipper, and then hammermilled to pass a 0.635 cm diamond screen. A charge consisting of 2500 gms of the resulting comminuted material containing about 15% moisture by weight was separately sprayed with a 37% formaldehyde solution to introduce 23 gms of formaldehyde, and with about 64 gms of PAPI, while tumbling in a drumtype blender. The furnish so produced contained about 18.2% moisture by weight.

Such furnish was formed as a mat of 6.35 cms thickness on an overlay, with the overlay being a 0.046 cm thick sheet of Crezon B210 produced by Crown Zellerbach Corporation, such being a phenol-formaldehyde resin treated paper sheet, manufactured by the beater loading process, having a .0025 cm phenolformaldehyde resin glueline applied to one face (weight of glueline about 40.5 gms/m²). The mat was prepared with the glueline of the Crezon sheet facing upwardly against the mat. A second Crezon sheet was placed on top of the mat, and the resulting sandwich pressed at about 190° C. at a pressure of about 22.1 kgs/cm² for 5 minutes to a thickness of about 1.22 cms. The resulting paperfaced particleboard core panel had an average density of 697 kgs/m³, an average modulus of rupture (MOR) of 137.37 kgs/cm², and an average modulus of elasticity (MOE) of 24,798 kgs/cm² when tested using ASTM procedures.

EXAMPLE II

The comminuted content of a recently dead Lodgepole pine, produced in the manner described in Example I, was prepared into a furnish by blending with such material 1.5% by weight PAPI and 0.5% by weight formaldehyde (introduced as 37% formaldehyde solution), based on the dry weight of the comminuted wood.

Overlays for the panel were prepared by spraying the faces of 0.254 cm thick Western Larch veneer sheets with phenolformaldehyde resin (a 48% solids liquid resin, designated OPA-197A sold by the Coos Bay Division of Georgia-Pacific Corporation), at the rate of 21.5 gms/m² solids basis. An assembly was prepared comprising a mat produced from the Lodgepole pine furnish, bounded on opposite sides by the veneer sheet overlays, the gluelines of said overlays facing inwardly toward the mat. The assembly when pressed as in Example I produced a finished panel having a thickness of about 1.9 cms and an average density of about 640 kgs/m³. Tested using ASTM procedures, the panel exhibited an average of MOR of about 464 kgs/cm², and an average MOE of about 69,250 kgs/cm².

EXAMPLE III

A veneer-faced particleboard product was prepared from a furnish prepared from Ponderosa pine planer shavings. In preparing the furnish, a 2 kg charge of the shavings hammermilled to pass a 0.635 cm diamond screen and containing 11.6% moisture by weight was placed in a blender. While in the blender, the shavings were sprayed with a 37% aqueous formaldehyde solution to introduce 47.8 gms of formaldehyde, and about 53.1 gms of PAPI. To reduce moisture absorption in the finished product, about 35.4 gms of a microcrystalline wax emulsion containing 50% by weight wax solids were also added. A suitable emulsion of this description is marketed as "Paracol 915N" by Hercules, Inc.

The furnish produced was formed into an approximately 7.6 cm thick mat on a 0.254 cm Douglas fir veneer sheet which had previously been spray coated with 21.5 gms/m$^2$ solids basis phenol-formaldehyde resin (OPL-197A), with such forming a glueline in the overlay disposed between the sheet and the mat. A similar Douglas fir veneer sheet was spray coated with resin and placed on top of the mat with the glueline facing downwardly toward the mat. The assembly so produced was pressed at 191° C. and a maximum pressure of 22.14 kgs/cm$^2$ for about 5 minutes to a thickness of 1.27 cms. The panel, using ASTM procedures, had an average MOR about 773 kgs/cm$^2$, and an average MOE of about 91,400 kgs/cm$^2$.

EXAMPLE IV

In another preparation, 2.2 kgs of Ponderosa pine planer shavings containing 10% moisture by weight were placed in a blender where the shavings were blended with 99 gms of liquid, approximately trifunctional, polymethylene polyphenylisocyanate and 39.6 gms of Paracol 915N to produce a furnish.

Overlays were prepared from Larch veneers of 0.254 cm thickness by applying gluelines to faces of such veneers spread at a rate of 54 gms/m$^2$ resin solids. The resin used was a phenol-formaldehyde resin produced from Bordens (MH-193-32; viscosity 300±50 cps at 25° C.; pH 10.3, specific gravity 1.22 at 21° C) sprayed at 40% solids.

A mat was prepared of the furnish of approximately 6.35 cms thickness over the sprayed resin side of one of the overlays. Such was prepressed at 0.049 kgs/cm$^2$ in a cold press and the other overlay was then placed on top of the prepressed mat, with the resin-sprayed side down. The assembly so produced was placed in a hot press and pressed for 5 minutes at 177° C. Maximum pressure used was 21.1 kgs/cm$^2$, the press being closed to produce desired thickness. A 1.25 cms thick panel was produced having an average density of 644 kgs/m$^3$, an average MOR of 749 kgs/cm$^2$, and an average MOE of 85,634 kgs/cm$^2$.

EXAMPLE V

In yet another preparation, an overlayed particleboard product was prepared from a furnish prepared as set forth in the Example IV. An overlay was prepared by placing a sheet of Plyocite (a high density phenol-formaldehyde resin treated paper sheet conforming to the requirements of paragraph 3.6.8., "High Density Overlay", U.S. product Standard PS-1-74 for Construction and Industrial Plywood, produced by Reichhold Chemicals, Inc. having a thickness of 0.203 mm, a weight of 181 gms/m$^2$ and a 50% resin solids content) on a caul plate, a piece of 0.254 cm thick Larch veneer on the high density sheet, and a sheet of Plyophen over the veneer sheet. Plyophen is a paper glueline product comprising a continuous dry film of phenol-formaldehyde resin supported on a cellulosic carrier produced by Reichhold Chemicals, Inc., having a thickness of 0.089 mm, a weight of 67.14 kgs/m$^2$ and a 65% resin solids content. On the overlay so prepared, a mat was produced from the furnish of 4.44 cm thickness. The mat and underlying overlay were prepressed at 0.049 kg/cm$^2$. Another overlay was then prepared over the prepressed assembly similar to the first described overlay, and such placed over the mat with the paper glueline disposed against the mat. Another caul plate was placed on top of the assembly and the assembly placed in a hot press with pressure applied for 5 minutes at 177° C., 22.5 kgs/cm$^2$ maximum pressure. A panel was produced having 1.217 cms thickness, a density of 663 kgs/m$^3$, an MOR of 1332 kgs/cm$^2$ and an MOE of 161,340 kgs/cm$^2$.

As has been described earlier, using the invention a superior type of overlayed product is producible where the overlay comprises a water permeable material such as paper and such is permeated with water prior to the application of heat and pressure. The following example illustrates this type of manufacture.

EXAMPLE VI

An overlayed particleboard product was prepared using the furnish of Example IV. A piece of kraft paper (127 gms/m$^2$) had a phenol-formaldehyde resin glueline prepared over one side by spraying the phenol-formaldehyde resin of Example IV over such side with an application rate of 53.8 gm/m$^2$ resin (solids basis). The opposite side of the sheet was sprayed with water, with the paper sheet retaining about 172 gms/m$^2$. The wetted paper sheet was placed on a caul plate with the resin coated side facing upwardly.

A mat was prepared on such sheet of approximately 3.81 cms thickness, and the mat and underlying overlay were then prepressed at 0.049 kg/cm$^2$. Another overlay was prepared and placed over such prepressed assembly with the coated side of the wetted sheet facing downwardly on the mat. Another caul plate was then placed on top of the upper overlay, and the entire assembly placed in a press where such was pressed for 3 minutes at 177° C., maximum pressure 21.1 kgs/cm$^2$.

A panel was produced having a thickness of 0.734 cms, a density of 717 kgs/m$^3$, an MOR of 224 kgs/cm$^2$, and an MOE of 31,970 kgs/cm$^2$. The sample after boiling for 4 hours showed no delamination.

EXAMPLE VII

A panel of the above description can be further processed to produce a veneer-faced product. Thus, 0.254 cm Larch veneers sprayed with resin as in Example IV were prepared, and the gluelines applied air dried for 2 hours. A liquid polymethylene polyphenylisocyanate was applied against opposite sides of the paper overlayed product, using an application rate of 43.06 gms/m$^2$. The paper coated product with isocyanate thereon was placed between the Larch veneer sheets with the resin coated surfaces of the sheets facing inwardly against the paper covered panel. This assembly was then placed between caul plates and pressed for 3 minutes at 177° C., maximum pressure of 12.3 kgs/cm$^2$. A very superior veneer faced panel product resulted, which exhibited no delamination when boiled for a period of 4 hours. The panel produced had a thickness of 1.217 cms, a density of 687 kgs/m$^3$, an MOR of 1,010 kgs/cm$^2$, and an MOE of 116,862 kgs/cm$^2$.

In all the above set forth examples sticking with the caul plates by reason of any polyisocyanate present was not noticed. As a consequence, there was no need to introduce release agents to inhibit such isocyanate caused sticking.

It is claimed and desired to secure by Letters Patent:

1. A method of making an overlayed product with comminuted cellulosic material as the core thereof, comprising
    producing a furnish of the comminuted cellulosic material by mixing therewith an organic polyisocyanate which operates upon the application of heat and pressure to bond the material,
    preparing as assembly comprising a mat formed of such furnish and against a side of said mat a sheet overlay, with phenol-formaldehyde resin distributed in said overlay and presented by said overlay toward said mat, and
    consolidating the furnish in said mat and said overlay to form an integral product by the application of heat and pressure, the phenol-formaldehyde resin during such consolidation forming a resinous barrier inhibiting penetration of the polyisocyanate through the overlay.

2. A product prepared by the method of claim 1.

3. The method of claim 1, wherein the overlay comprises a water permeable sheet such as a paper sheet and the like, and at the initiation of the consolidation by the application of heat and pressure, said sheet is impregnated with water.

4. The method of claim 3, wherein said sheet is impregnated with water by distributing water over the side of the sheet facing away from said mat after preparing the assembly comprising mat and overlay.

5. The method of claim 1, wherein said assembly is prepared with an overlay formed of an outer sheet layer and an inner sheet layer disposed toward said mat from the outer sheet layer, said inner sheet layer comprising phenol-formaldehyde resin supported in a cellulosic carrier.

6. The method of claim 1, wherein said assembly is prepared with said mat against an overlay comprising a sheet of wood veneer and a paper glueline disposed between said sheet of wood veneer and said mat, the paper glueline comprising a phenolformaldehyde resin supported in a cellulosic carrier.

7. In the manufacture of an overlayed product, the method comprising
    producing a furnish of comminuted cellulosic material by mixing it with an organic polyisocyanate which operates upon the application of heat and pressure to bond the material,
    preparing an assembly comprising a mat of such furnish with such mat disposed between overlays disposed on opposite sides of the mat, each of such overlays comprising a sheet and having phenol-formaldehyde distributed in the overlay presented by the overlay toward said mat, and
    consolidating the furnish in said mat and said overlays to form the product by the application of heat and pressure, the phenol-formaldehyde resin during such consolidation forming a resinous barrier inhibiting penetration of the overlays by said polyisocyanate.

8. A product prepared by the method of claim 7.

9. The method of claim 7, wherein each overlay comprises a water permeable sheet such as a paper sheet and the like, and at the initiation of consolidation by the application of heat and pressure the sheet in the overlays are essentially saturated with water.

10. The method of claim 7, wherein each overlay comprises a veneer sheet layer and phenol-formaldehyde resin on the side of said veneer sheet layer which faces the mat.

11. The method of claim 10, wherein the phenolformaldehyde resin is supported in a cellulosic carrier.

* * * * *